(12) United States Patent
Nakajima

(10) Patent No.: US 10,202,165 B2
(45) Date of Patent: Feb. 12, 2019

(54) BICYCLE WHEEL-SECURING AXLE

(71) Applicant: Shimano Inc., Sakai, Osaka (JP)

(72) Inventor: Jun Nakajima, Sakai (JP)

(73) Assignee: SHIMANO INC., Osaka (JP)

( * ) Notice: Subject to any disclaimer, the term of this patent is extended or adjusted under 35 U.S.C. 154(b) by 0 days.

(21) Appl. No.: 14/819,455

(22) Filed: Aug. 6, 2015

(65) Prior Publication Data
US 2017/0036728 A1  Feb. 9, 2017

(51) Int. Cl.
*B62K 25/02* (2006.01)
*F16B 37/08* (2006.01)
*F16D 41/36* (2006.01)
*F16D 41/26* (2006.01)

(52) U.S. Cl.
CPC ............ *B62K 25/02* (2013.01); *F16B 37/08* (2013.01); *F16D 41/36* (2013.01); *B62K 2025/025* (2013.01); *B62K 2206/00* (2013.01); *F16D 41/26* (2013.01)

(58) Field of Classification Search
CPC ...... B62K 25/02; B62K 19/30; B60B 35/004; B60B 35/04; B60B 35/109; B60B 27/023; B60B 27/026; F16D 41/36; F16B 37/08
USPC .......................... 301/124.2, 4, 109
See application file for complete search history.

(56) References Cited

U.S. PATENT DOCUMENTS

| | | |
|---|---|---|
| 3,963,361 A | 6/1976 | Schenk |
| 4,679,862 A | 7/1987 | Luo |
| 4,964,287 A | 10/1990 | Gaul |
| 5,012,575 A | 5/1991 | Heideman |
| 5,118,125 A * | 6/1992 | Plunkett ............ B62K 25/02 280/279 |
| 5,190,301 A | 3/1993 | Malewicz |
| 5,265,824 A | 11/1993 | Sato |
| 5,314,279 A * | 5/1994 | Ewing ............ F16B 39/282 411/134 |
| 5,875,947 A | 3/1999 | Noel et al. |
| 6,120,106 A | 9/2000 | Liao |
| 6,152,541 A * | 11/2000 | Huber ............ B62K 25/02 301/124.2 |
| 6,523,659 B2 * | 2/2003 | Kanehisa ............ B60B 27/0005 192/64 |
| 6,886,894 B2 | 5/2005 | Kanehisa et al. |

(Continued)

FOREIGN PATENT DOCUMENTS

WO   WO 2009150518 A1 * 12/2009 ............. B62K 25/02

OTHER PUBLICATIONS

U.S. Office Action dated Oct. 7, 2016 issued in U.S. Appl. No. 14/543,913.

*Primary Examiner* — S. Joseph Morano
*Assistant Examiner* — Scott A Browne

(57) ABSTRACT

A wheel-securing axle secures a wheel to a bicycle body. The axle has a shaft and a one-way clutch mechanism. The axle includes a shaft that has a threaded section and a rotational center axis. The one-way clutch mechanism includes a lock member for contacting the bicycle body. The one-way clutch mechanism permits relative rotation between the lock member and the shaft in a first direction about the rotational center axis and limits relative rotation between the lock member and the shaft in a second direction. The lock member limits relative rotation between the shaft and the bicycle body in the first direction when the lock member contacts the bicycle body.

21 Claims, 7 Drawing Sheets

(56) References Cited

U.S. PATENT DOCUMENTS

| | | | |
|---|---|---|---|
| 7,556,321 B2* | 7/2009 | Hara | B60B 27/026 |
| | | | 301/110.5 |
| 7,654,546 B2* | 2/2010 | Watarai | B62K 25/02 |
| | | | 280/260 |
| 7,735,937 B2* | 6/2010 | Chonan | B62K 25/02 |
| | | | 301/124.2 |
| 8,641,151 B2 | 2/2014 | Kamada | |
| 8,777,330 B2* | 7/2014 | Lim | B62K 25/02 |
| | | | 301/124.2 |
| 2009/0102276 A1 | 4/2009 | Mercat | |
| 2009/0140571 A1 | 6/2009 | Chonan | |
| 2012/0321373 A1 | 12/2012 | Chang | |
| 2013/0140876 A1 | 6/2013 | Lim | |
| 2013/0328385 A1* | 12/2013 | Kuo | B60B 27/026 |
| | | | 301/124.2 |
| 2016/0214678 A1 | 7/2016 | Schlanger | |

\* cited by examiner

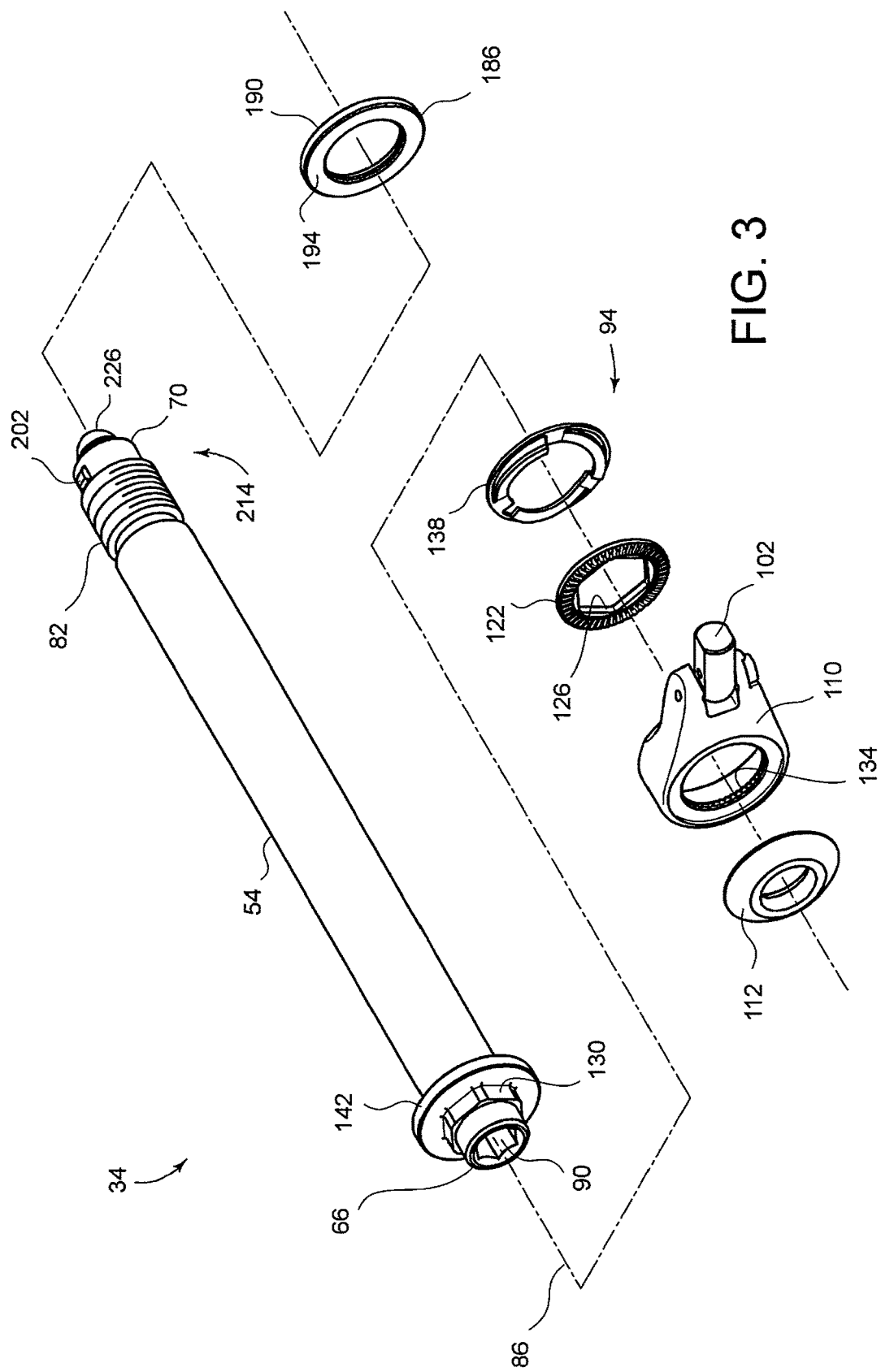

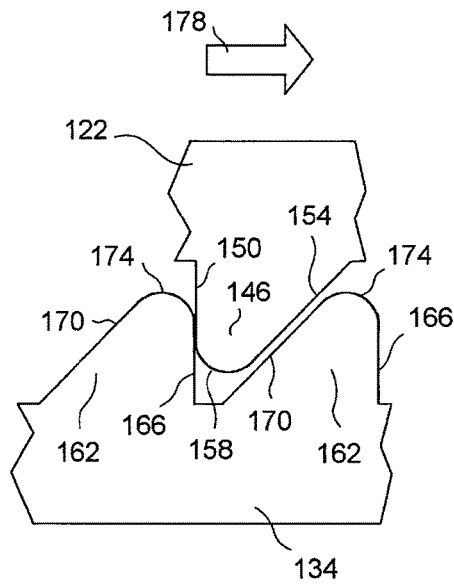
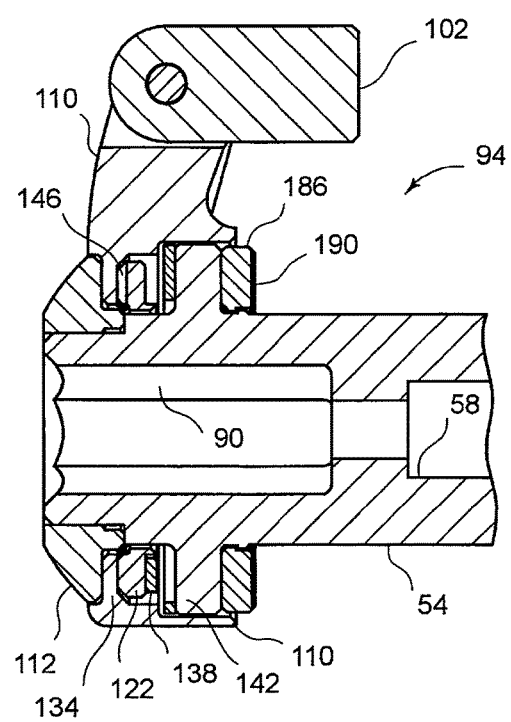
FIG. 6       FIG. 7
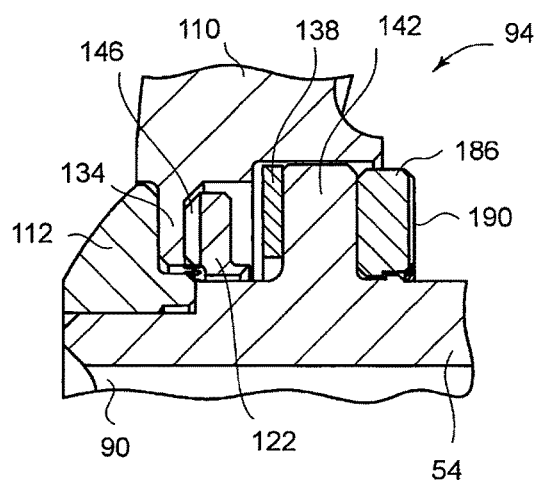
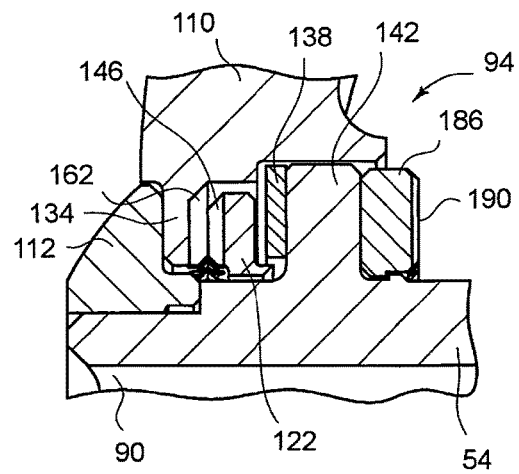
FIG. 8       FIG. 9

BICYCLE WHEEL-SECURING AXLE

BACKGROUND OF THE INVENTION

The invention generally relates to axles for bicycles, and more particularly to a wheel-securing axle for bicycles that includes a one-way clutch structure to prevent loosening of the axle.

A typical bicycle wheel is fastened to a hub support by a wheel-securing axle. Typically, a distal section of the wheel-securing axle is threaded. The threaded distal section is mated with a nut or to a threaded hole in the hub support to fasten the wheel-securing axle to the frame or fork of the bicycle.

SUMMARY OF THE INVENTION

The invention is a wheel-securing axle for securing a wheel to a bicycle body. The wheel-securing axle includes a shaft that includes a first end portion and a second end portion opposite to the first end portion. The second end portion includes a threaded section. The shaft has a rotational center axis. The wheel-securing axle further includes a one-way clutch mechanism including a lock member adapted to contact the bicycle body. The one-way clutch mechanism is configured to permit rotation of the shaft with respect to the lock member in a first direction about the rotational center axis and to limit rotation of the shaft with respect to the lock member in a second direction opposite to the first direction. The lock member is configured to limit relative rotation of the shaft with respect to the bicycle body in the second direction about the rotational center axis when the lock member contacts the bicycle body.

In another aspect, the one-way clutch mechanism is located at one of the first and second end portions of the shaft.

In another aspect, the one-way clutch mechanism has at least one tooth element that limits rotation of the shaft with respect to the lock member in the second direction.

In another aspect, the one-way clutch mechanism includes an annular tooth element configured to rotate integrally with the shaft.

In another aspect, the one-way clutch mechanism includes a housing element, and the lock member is coupled to the housing element.

In another aspect, the one-way clutch mechanism includes a first annular tooth element that rotates integrally with the shaft, a second annular tooth element that rotates about the rotational center axis independently of the shaft, and a tooth element biasing member that elastically biases one of the first and second annular tooth elements toward the other of the first and second annular tooth elements in an axial direction of the rotational center axis.

In another aspect, the first annular tooth element includes a plurality of teeth provided around the rotational center axis, and each of the teeth includes first and second inclined surfaces, which are inclined at different angles from each other, and a peak formed between the first and second inclined surfaces.

In another aspect, the second annular tooth element includes a plurality of teeth provided around the rotational center axis, and the teeth of the second annular tooth element are shaped like the teeth of the first annular tooth element and are configured to engage with the teeth of the first annular tooth element.

In another aspect, the tooth element biasing member biases the first annular tooth element toward the second annular tooth element so that the first annular tooth element is movable in the axial direction relative to the second annular tooth element.

In another aspect, the one-way clutch mechanism includes a housing element. The housing element is supported by the shaft so that the housing element is rotatable around the rotational center axis, the housing element rotates together with the shaft when rotated in the second direction, and the housing element rotates independently from the shaft when rotated in the first direction.

In another aspect, the lock member is pivotally coupled to the housing element so that the lock member can be manually pivoted to a locking position in which the bicycle body contacts the locking member and prevents rotation of the housing element in the second direction.

In another aspect, the shaft includes a built-in socket formed in an end surface of one of the first and second end portions, and the built-in socket is adapted to receive a tool for screwing the threaded section of the shaft into a correspondingly threaded opening in the bicycle body.

In another aspect, the wheel-securing axle further includes a washer. The washer includes a non-smooth surface that is adapted to contact a fastening surface of the bicycle body, and a smooth surface that contacts a flange of the shaft. The washer is clamped between the flange and the fastening surface of the bicycle body when the wheel-securing axle is fastened to the bicycle body.

In another aspect, the shaft is a hollow body includes a central through passage.

In another aspect, the wheel-securing axle includes a retainer element. The one-way clutch mechanism is located on the first end portion, and the retainer element is arranged on the second end portion of the shaft.

In another aspect, the retainer element has a maximum radius that is larger than a radius of the threaded section, and the retainer element is capable of being radially retracted to a radius that is less than or equal to that of the threaded section to permit removal of the shaft from the bicycle body.

In another aspect, the retainer element is biased in a radially outward direction by an actuator element, and the actuator element is biased in an axial direction by an actuator biasing element.

In another aspect, a button extends axially from the second end portion of the shaft, and the button is coupled to the actuator element, and the retainer element is retracted radially inward by pushing the button in the axial direction.

Other advantages and features of the present invention will become apparent to those skilled in the art from the following detailed description and the drawings.

BRIEF DESCRIPTION OF THE DRAWINGS

FIG. 3 is an exploded perspective view of the wheel-securing axle;

FIG. 6 is a diagrammatic partial top view of annular tooth elements of the one-way clutch;

FIG. 7 is a cross sectional view of a one-way clutch mechanism and a lock member;

FIG. 8 is a cross sectional view of the one-way clutch mechanism in a fully engaged state;

FIG. 9 is a cross sectional view of the one-way clutch mechanism in a slipping, or reversing, state;

DESCRIPTION OF THE EMBODIMENTS

Figure 1:
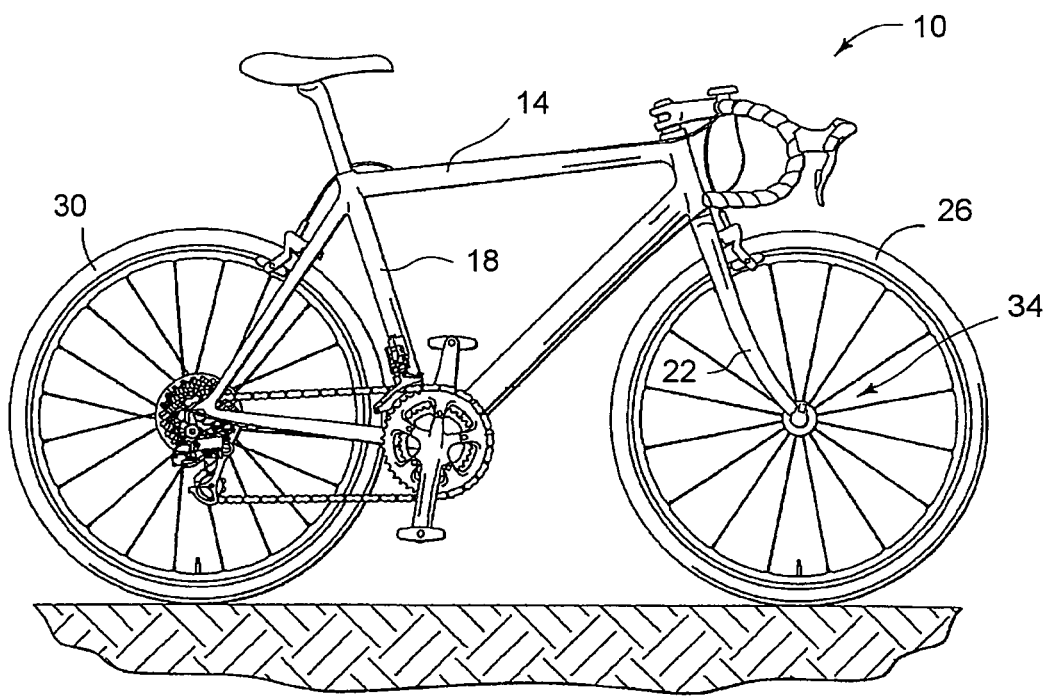
FIG. 1 is a right side view of a bicycle that includes at least one wheel-securing axle.

FIG. 1 shows a bicycle 10. The bicycle 10 includes a bicycle body 14, a front wheel 26, and a rear wheel 30. Each of the wheels 26, 30 includes a hub 32. The bicycle body 14 includes the frame 18 and the fork 22. The fork 22 is pivotally attached to the frame 18. The bicycle further includes at least one wheel-securing axle 34 for securing a wheel 26, 30 to the bicycle body 14. Except for the wheel-securing axle 34, the bicycle 10 is conventional and will not be described in detail.

Figure 2:
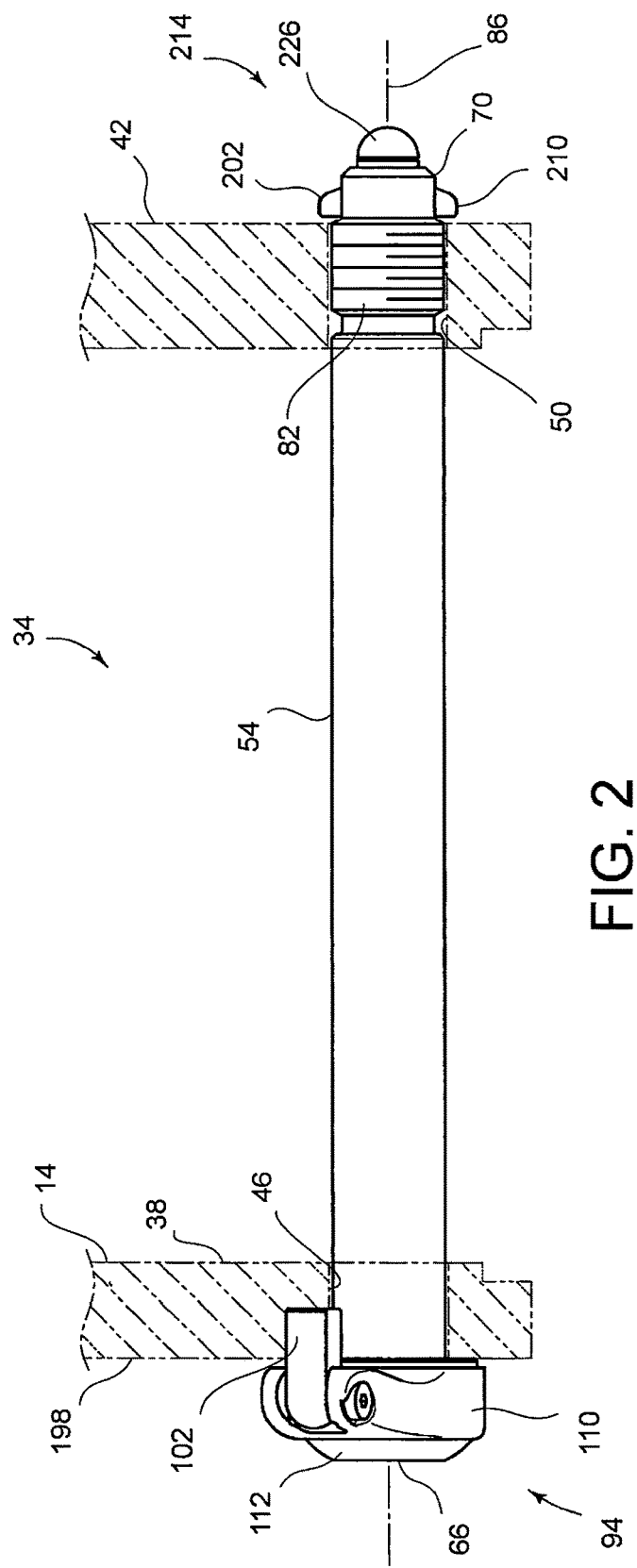
FIG. 2 is a front view of the wheel-securing axle, partially in cross section.

Referring to FIG. 2, the bicycle body 14 includes a first hub support 38 and a second hub support 42. In the embodiment illustrated in FIG. 2, the first hub support 38 includes an unthreaded through hole 46, and the second hub support 42 includes a threaded opening 50, which is axially aligned with the through hole 42. The first hub support 38 and the second hub support 42 can be, for example, the arms of the fork 22 or parts of the frame 18 that support the rear wheel 30. FIG. 2 shows the wheel-securing axle 34 secured to the bicycle body 14. The wheel-securing axle 34 can be used to secure either the front wheel 26 or the rear wheel 30 to the bicycle body 14. The parts of the wheel 26, 30 and hub 32 that are secured to the bicycle body 14 by the wheel-securing axle 34 are omitted in FIG. 2 for simplification.

Figure 10:
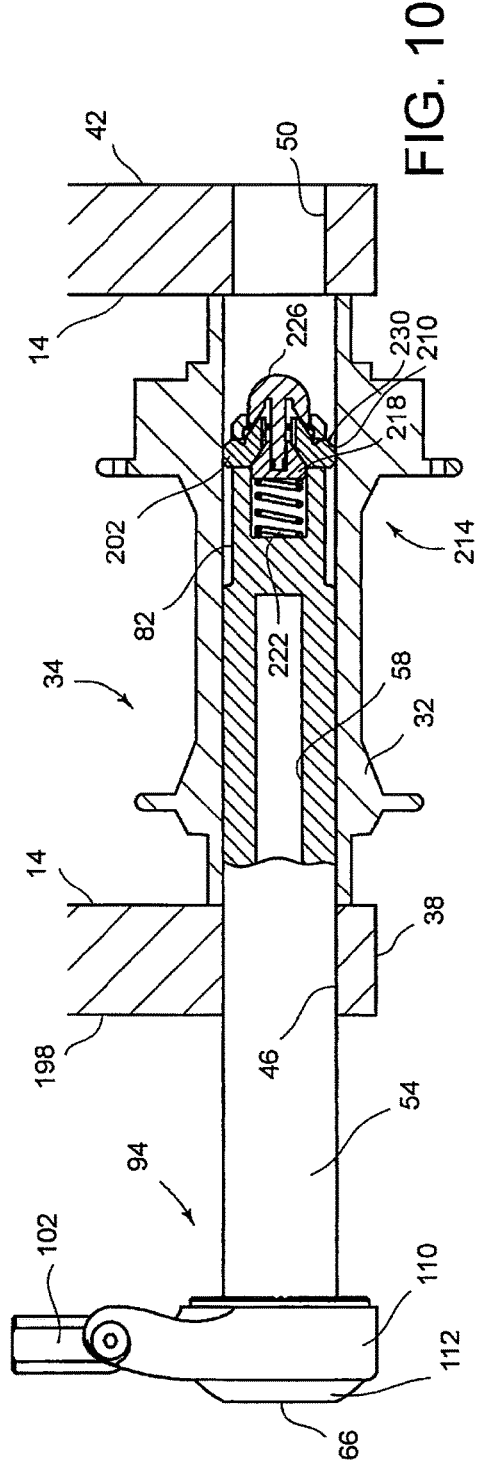
FIG. 10 is a front view, partially in cross section, of the wheel-securing axle of FIG. 2 during assembly.
Figure 11:
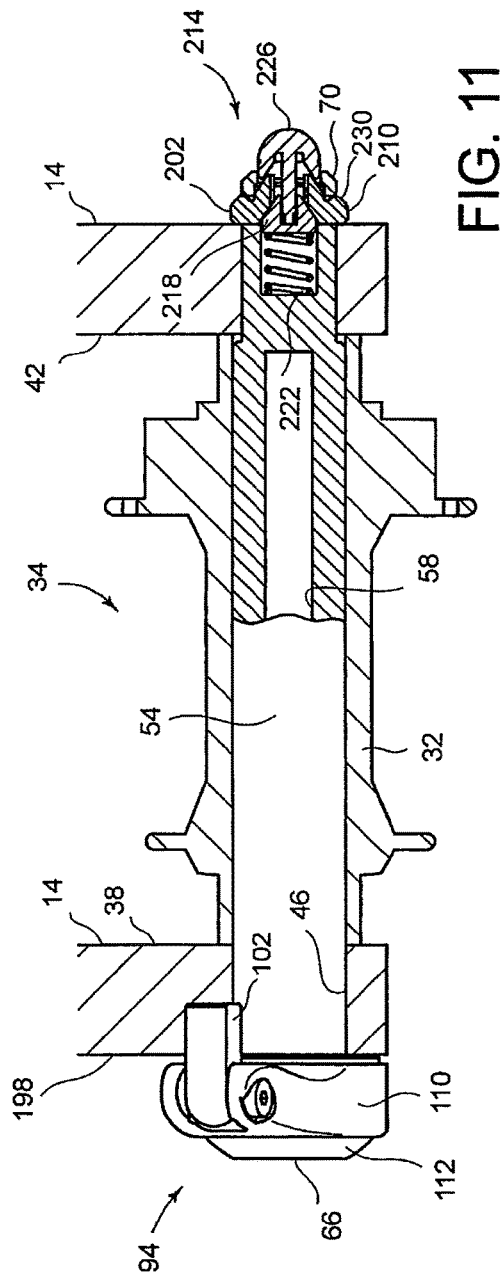
FIG. 11 is a front view, partially in cross section, of the wheel-securing axle of FIG. 2 in a secured state.

The wheel-securing axle 34 includes a shaft 54, which is sometimes referred to as a skewer shaft. In the illustrated embodiment the shaft 54 is a hollow body including a central through passage 58, as shown in FIGS. 7, 10, and 11. Alternatively, the shaft 54 can be solid. The shaft 54 includes a first end portion 66 and a second end portion 70. The second end portion 70 is opposite to the first end portion 66. The second end portion 70 includes a threaded section 82. The shaft 54 has a rotational center axis 86.

The shaft 54 includes a built-in socket 90 formed in an end surface of one of the first and second end portions 66, 70. The built-in socket 90 is adapted to receive a tool (not shown) for screwing the threaded section 82 of the shaft 54 into the correspondingly threaded opening 50 in the bicycle body 14. The socket 90 functions as an engagement portion that engages a rotation tool, such as, an Allen key or an electric power tool. The socket 90 is, for example, a hexagonal hole. Thus, during assembly, the shaft 54 is fitted to the bicycle body 14 and the hub 32, such that the shaft 54 first enters the unthreaded through hole 46. After passing through the hub 32, the threaded section 82 enters the threaded opening 50. Then, the tool is fitted into the socket 90 to rotate the shaft 54 in order to tighten the threaded section 82 to the threaded opening 50 as shown in FIG. 2 to secure the wheel 26, 30 to the bicycle body 14.

The wheel-securing axle 34 further includes a one-way clutch mechanism 94, which includes a lock member 102 adapted to contact the bicycle body 14. The one-way clutch mechanism 94 is located at one of the first and second end portions 66, 70 of the shaft 54. The one-way clutch mechanism 94 is configured to permit relative rotation of the shaft 54 with respect to the lock member 102 in a first direction about the rotational center axis 86 and to limit relative rotation of the shaft 54 with respect to the lock member 102 in a second direction, opposite to the first direction. The lock member 102 is configured to limit relative rotation of the shaft 54 with respect to the bicycle body 14 in the second direction about the rotational center axis 86 when the lock member 102 contacts the bicycle body 14.

Thus, for example, if the threaded section 82 is threaded with right-handed threads, such that the shaft 54 is tightened when rotated clockwise, as viewed from the first end portion, then the first direction is clockwise and the second direction is counterclockwise, and the shaft 54 is permitted to rotate with respect to the lock member 102 in the clockwise direction by the one-way clutch mechanism 94. However, if the shaft 54 is rotated counterclockwise with respect to the lock member 102, the one-way clutch mechanism 94 engages to prevent rotation of the shaft 54 with respect to the lock member 102, and the lock member 102 (if the lock member 102 is enabled) engages the bicycle body 14 to limit counterclockwise rotation of the shaft 54. Thus, loosening of the shaft 54 is prevented by engagement between the lock member 102 and the bicycle body 14. If the threaded section 82 is threaded with left-handed threads, then the one-way clutch mechanism 94 can be made to function in an opposite manner to prevent loosening of the shaft 54.

In the embodiment illustrated in FIG. 2, the lock member 102 prevents rotation of the shaft 54 in a loosening direction when the lock member 102 contacts the first hub support 38. The wheel-securing axle 34 can be reversed from the orientation shown in FIG. 2. That is, the threaded opening can be formed in the first hub support 38, the unthreaded through hole 46 can be formed in the second hub support 42, and the wheel securing axle 34 can be fastened such that the lock member 102 prevents loosening rotation of the shaft 54 when the lock member 102 contacts the second hub support 42.

Figure 12:
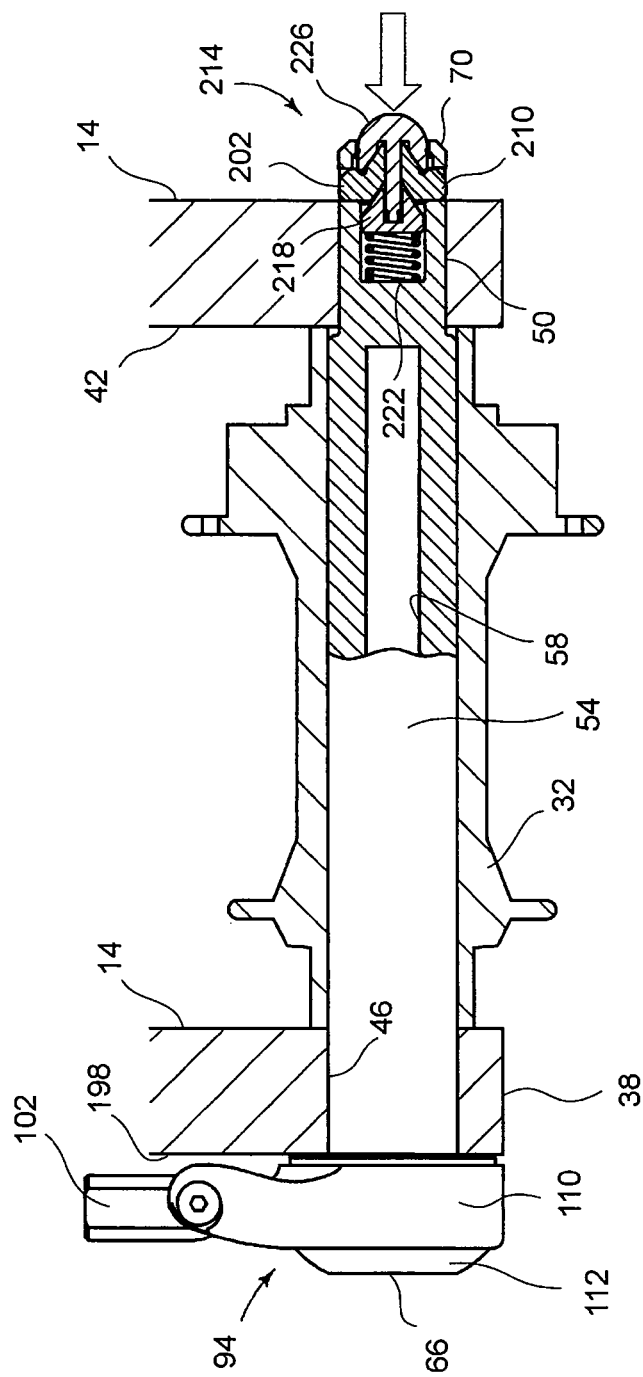
FIG. 12 is a front view, partially in cross section, of the wheel-securing axle of FIG. 2 in a state ready for disassembly.

Referring to FIGS. 2-7, the one-way clutch mechanism 94 includes a housing element 110, and the lock member 102 is coupled to the housing element 110. The lock member 102 is pivotally coupled to the housing element 110 so that the lock member 102 can be manually pivoted to a locking position in which the bicycle body 14 contacts the locking member 102 and prevents rotation of the housing element in the second direction. That is, the lock member 102 is pivotally attached to the housing element 110 as shown in FIG. 7. The lock member 102 is pivotal between an enabled position, or the locking position, which is illustrated in FIGS. 7 and 11, and a disabled position, or an unlocking position, which is illustrated in FIGS. 10 and 12. When the lock member 102 is in the disabled position, it avoids contact with the bicycle body 14 and has no effect. When the lock member 102 is in the enabled position, the bicycle body 14 interferes with the rotation of the lock member 102 and the housing element 110 in the loosening direction of the shaft 54, which provides an anti-loosening effect for the wheel-securing axle 34.

As shown in FIGS. 3, and 7-9, a cap 112 can be located at the first end portion 66 of the shaft 54 to prevent the housing element 110 from escaping from the shaft 54. The cap 112 can be fixed to the shaft 54 by threads (not shown) or by press fitting, for example. The cap 112 does not interfere with the rotation of the housing element 110.

Referring to FIGS. 2-9, the housing element 110 is supported by the shaft 54 so that the housing element 110 is rotatable around the rotational center axis 86. The housing element 110 rotates together with the shaft 54 when the housing element 110 is rotated in the first direction, and the housing element 110 rotates independently from the shaft 54 when the housing element 110 is rotated in the second direction. That is, if the housing element 110 is rotated in the first direction, which is the direction in which the threaded section 82 is tightened, the housing element 110 and the shaft 54 must rotate integrally by operation of the one-way clutch mechanism 94. On the other hand, the housing element 110 can rotate independently from the shaft 54 when rotated in the second direction with respect to the shaft 54, since such relative motion would cause the one-way clutch mechanism 94 to slip. This is the same relative motion that occurs, for example, when the shaft 54 is being tightened and the housing element 110 is stationary.

Figure 4:
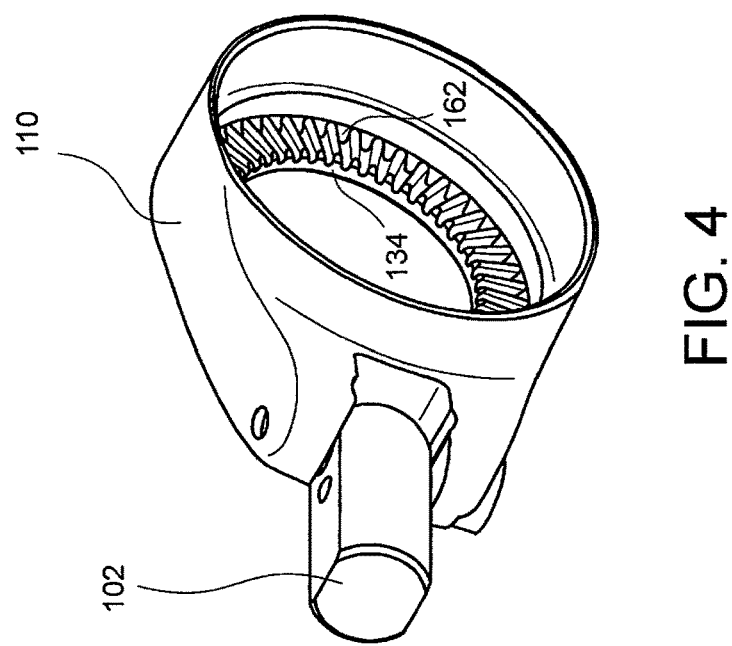
FIG. 4 is a perspective view of a housing element of the wheel-securing axle of FIG. 3.

Any of many known one-way clutch mechanisms can be employed as the one way clutch mechanism. In the illustrated embodiment, the one-way clutch mechanism 94 has at least one tooth element 122 that limits relative rotation between the lock member 102 and the shaft 54 in the second direction. Referring to FIG. 4, the one-way clutch mechanism 94 includes an annular tooth element 122 configured to rotate integrally with the shaft 54. The annular tooth element 122 has a hexagonal through opening 126, which mates with a corresponding hexagonal surface 130 on the shaft 54. Engagement between the hexagonal through opening 126 and the hexagonal surface 130 causes the annular tooth element 122 and the shaft 54 to rotate as one. However, the hexagonal surface 130 does not prevent the annular tooth element 122 from moving axially. Alternatively, other known structures for permitting axial movement but preventing rotational movement of the annular tooth element 122 with respect to the shaft 54, such as a key and longitudinal slot, can be employed instead of the non-circular opening and corresponding opening shown in FIG. 3.

Referring to FIGS. 3-9, in the illustrated embodiment, the annular tooth element 122 is a first annular tooth element 122 of a pair of annular tooth elements 122, 134. The one-way clutch mechanism 94 includes the first annular tooth element 122, which rotates integrally with the shaft 54, a second annular tooth element 134 that rotates about the rotational center axis 86, independently of the shaft 54, and a tooth element biasing member 138 that elastically biases one of the first and second annular tooth elements 122, 134 toward the other of the first and second annular tooth elements 122, 134 in an axial direction of the rotational center axis 86.

The tooth element biasing member 138 biases the first annular tooth element 122 toward the second annular tooth element 134 so that the first annular tooth element 122 is movable in the axial direction relative to the second annular tooth element 134. In the illustrated embodiment, as shown in FIGS. 3 and 6-9, the tooth element biasing member 138 is located between the first annular tooth element 122 and a flange 142 formed on the shaft 54. Therefore, the tooth element biasing member 138 elastically urges the first annular tooth element 122 axially toward the first end portion 66 of the shaft 54 and towards the second annular tooth element 134. Although the tooth element biasing member 138 is a finger-spring washer in the illustrated embodiment, another spring element, such as an elastomeric element, a wave spring washer or a coil spring, can be used as an alternative tooth element biasing member 138.

Figure 5:
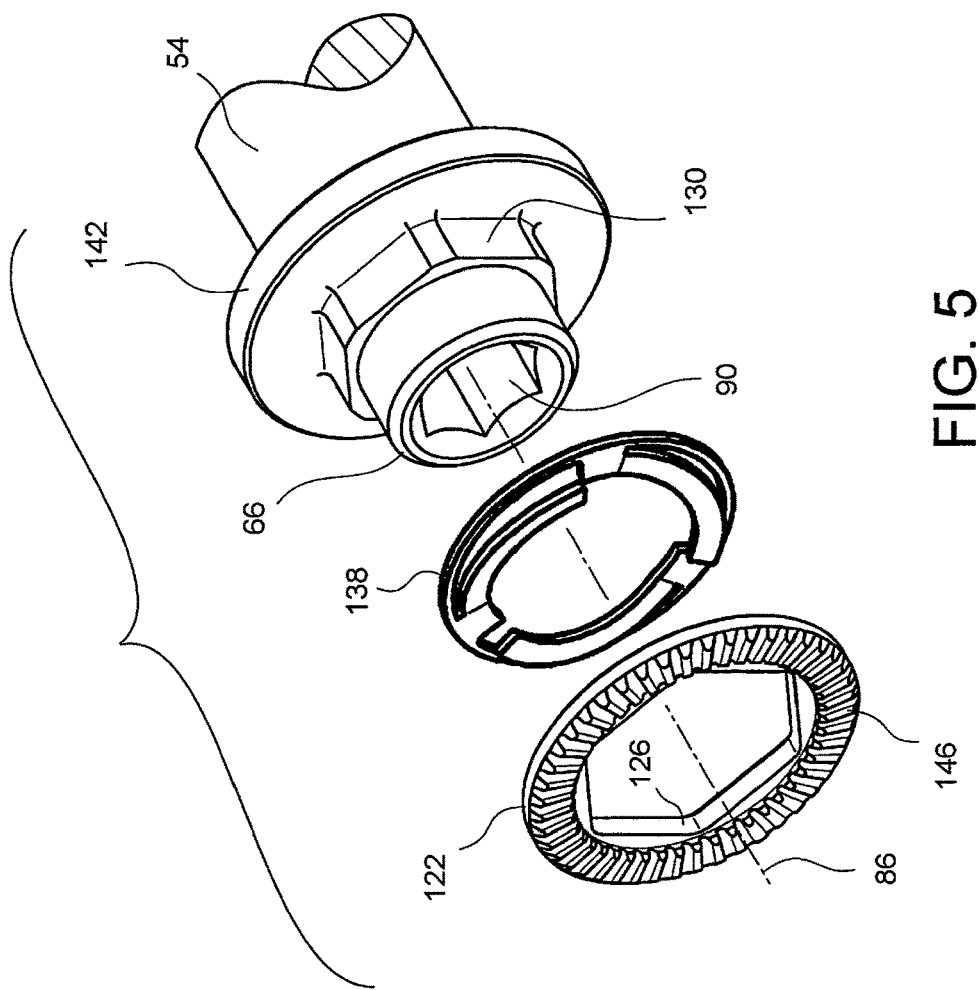
FIG. 5 is a perspective view of an annular tooth element and a first end of a shaft.

As shown in FIGS. 4-6, the first annular tooth element 122 includes a plurality of teeth 146 provided around the rotational center axis 86. Each of the teeth 146 includes first and second inclined surfaces 150, 154, which are inclined at different angles from each other, and a peak 158 formed between the first and second inclined surfaces 150, 154. Similarly, the second annular tooth element 134 includes a plurality of teeth 162 provided around the rotational center axis 86, and the teeth 162 of the second annular tooth element 134 are shaped like the teeth 146 of the first annular tooth element 122 and are configured to engage with the teeth 146 of the first annular tooth element 122. That is, each of the teeth 162 of the second annular tooth element 134 has a first inclined surface 166, a second inclined surface 170, and a peak 174.

FIG. 6 is a diagrammatic view illustrating one of the teeth 146 of the first annular tooth element 122 located between two of the teeth 162 of the second annular tooth element 134. FIG. 6 shows the first inclined surface 150, the second inclined surface 154, and the peak 158 of the first annular tooth element 122 and the first inclined surface 166, the second inclined surface 170, and the peak 174 of the second annular tooth element 134. Rotation of the first annular tooth element 122 in the first direction, which is indicated by an arrow 178 in FIG. 6, occurs when the shaft 54 is rotated in the first direction by the tool and the socket 90. In this case, engagement of the second inclined surfaces 154, 170 with one another causes the first annular tooth element 122 to move axially toward the second end portion 70 of the shaft 54 against the force applied by the tooth element biasing member 138. That is, the first and second annular tooth elements 122, 134 rotate relative to one another, the teeth slide past one another, and the one-way clutch mechanism 94 slips. Slippage of the one-way clutch mechanism 94 is illustrated in FIG. 9. That is, FIG. 9 shows the first annular tooth element 122 to be moved axially away from the second annular tooth element 134 and the peaks 158, 174 to be in contact. FIG. 8, on the other hand, shows the one-way clutch mechanism 94 in full engagement with the teeth 146, 162 of the first and second annular tooth elements 122, 134 fully meshed. Thus, rotation of the first annular tooth element 122 in the second direction, which would occur if the shaft 54 loosens, results in engagement of the one-way clutch mechanism 94. In this state, relative rotation of the first and second annular tooth elements 122, 134 is not permitted. Relative rotation between the first and second annular tooth elements 122, 134 is not permitted because the first inclined surfaces 150, 166 are parallel to or substantially parallel to the rotational center axis 86, which eliminates or substantially eliminates axial forces that would disengage the one-way clutch mechanism 94. In these circumstances, assuming that the lock member 102 is enabled, rotation of the shaft 54 in the second direction would be prevented by engagement of the lock member 102 with the bicycle body 14.

In the illustrated embodiment, the first annular tooth element 122 is permitted to move axially and the second annular tooth element 134 is formed integrally with the housing element 110 and is fixed axially. Alternatively, for example, in a reversal of parts, the second annular tooth element 134 can be a separate part that is axially movable and axially biased but is prevented from rotating with respect to the housing element 110, and the first annular tooth element 122 can be fixed to the shaft 54 or formed integrally with the flange 142, for example.

As shown in FIGS. 3 and 7-9, the wheel-securing axle 34 further includes a washer 186. The washer 186 includes a non-smooth surface 194, which is adapted to contact a fastening surface 198 of the bicycle body 14 (See FIG. 2), and a smooth surface 194, which contacts the flange 142 of the shaft 54. The washer 186 is clamped between the flange 142 and the fastening surface 198 of the bicycle body when the wheel-securing axle 34 is fastened to the bicycle body 14. Since the smooth surface 194 contacts the flange 142, the washer 186 does not interfere with rotation of the shaft 54 during assembly. The non-smooth surface 190 can be, for example, a rough surface, a knurled surface, a surface including regular or irregular projections, or a surface including regular or irregular grooves.

As shown in FIGS. 3 and 10-12, the wheel-securing axle 34 includes a retainer element 202. The one-way clutch mechanism 94 is located on the first end portion 66, and the retainer element 202 is arranged on the second end portion 70 of the shaft 54. The retainer element 202 has a maximum radius that is larger than a radius of the threaded section 82, and the retainer element 202 is capable of being radially retracted to a radius that is less than or equal to that of the threaded section 82 to permit removal of the shaft 54 from the bicycle body 14. In the embodiment illustrated in FIGS. 10-12, the retainer element 202 is a first retainer element 202, which along with a second retainer element 210, forms a pair of retainer elements 202, 210. The retainer elements 202, 210 are parts of a retainer mechanism 214, which prevents the wheel-securing axle 34 from escaping from the bicycle body 14 unless the retainer mechanism 214 is manipulated to permit the removal of the wheel-securing axle 34. Although the retainer mechanism 214 is shown in FIGS. 2 and 3, the retainer mechanism 214 is optional and is not a required part of the wheel-securing axle 34 of FIGS. 2 and 3.

As shown in FIGS. 10-12, the retainer mechanism 214 further includes an actuator element 218, an actuator biasing element 222, and a button 226. The retainer element 202 is biased in a radially outward direction by the actuator element 218, and the actuator element 218 is biased in an axial direction by the actuator biasing element 222. The actuator element 218 serves as a cam and the retainer elements 202, 210 serve as cam followers to cause radial movement of the retainer elements 202, 210 in response to axial movement of the actuator element 218. In the illustrated embodiment, the actuator biasing element 222 is a coil spring; however, other known types of springs can be employed to serve the same purpose.

The retainer elements 202, 210 have inclined distal surfaces 230, which cause the retainer elements 202, 210 to be retracted when the second end portion 70 of the wheel-securing axle 34 is inserted into the hub 32 and the internal surface of the hub 32 contacts the retainer elements 201, 210, as shown in FIG. 10. As shown in FIG. 11, when the retainer elements 202, 210 exit from the outer end of the threaded opening 50 of the bicycle body 14 during assembly, the retainer elements 202, 210 extend radially under the force of the actuator biasing element 222 to retain the wheel-securing axle 34 to the bicycle body 14.

The button 226 extends axially from the second end portion 70 of the shaft 54, and the button 226 is coupled to the actuator element 218. The retainer element 202 is retracted radially inward by pushing the button 226 in the axial direction. During removal of the wheel-securing axle 34, the button 226 is depressed manually, as indicated by the arrow in FIG. 12. The button 226 moves the actuator element 218 axially so that the actuator element 218 moves axially toward the first end portion 66 of the shaft 54 (leftward in FIG. 12), which permits the retainer elements 202, 210 to retract. In addition, the button 226 applies radially inward forces to the retainer elements 202, 210 to cause the retainer elements 202, 210 to retract. Upon the retraction of the retainer elements 202, 210, the wheel-securing axle 34 can be removed in the axial direction from the bicycle body 14 in a reversal of the installation operation.

While the invention has been described in detail with respect to specific embodiments, those skilled in the art, upon attaining an understanding of the specific embodiments, may readily conceive of alterations, variations, and equivalents to these embodiments. Accordingly, the scope of the invention should be assessed as that of the appended claims and their equivalents.

The invention claimed is:

1. A wheel-securing axle assembly for securing a wheel to a bicycle body, wherein the wheel-securing axle assembly comprises:
   a shaft that includes a first end portion and a second end portion, wherein the second end portion being located at an opposite end of the shaft with respect to the first end portion, the second end portion including a threaded section, the shaft having a rotational center axis;
   a one-way clutch mechanism including a lock member adapted to contact the bicycle body, the one-way clutch mechanism being located at the first end portion or second end portion and being configured to permit relative rotation of the shaft with respect to the lock member in a first direction about the rotational center axis regardless of whether the lock member is in contact with the bicycle body or not and to limit relative rotation of the shaft with respect to the lock member in a second direction opposite to the first direction regardless of whether the lock member is in contact with the bicycle body or not, the lock member being configured to limit relative rotation of the shaft with respect to the bicycle body in the second direction about the rotational center axis when the lock member contacts the bicycle body.

2. The wheel-securing axle assembly according to claim 1, wherein the one-way clutch mechanism has at least one tooth element that limits rotation of the shaft with respect to the lock member in the second direction.

3. The wheel-securing axle assembly according to claim 1, wherein the one-way clutch mechanism includes an annular tooth element configured to rotate integrally with the shaft.

4. The wheel-securing axle assembly according to claim 1, wherein the one-way clutch mechanism includes a housing element, and the lock member is coupled to the housing element.

5. The wheel-securing axle assembly according to claim 1, wherein the one-way clutch mechanism includes
   a first annular tooth element that rotates integrally with the shaft,
   a second annular tooth element that rotates about the rotational center axis independently of the shaft, and
   a tooth element biasing member that elastically biases one of the first and second annular tooth elements toward the other of the first and second annular tooth elements in an axial direction of the rotational center axis.

6. The wheel-securing axle assembly according to claim 5, wherein
   the first annular tooth element includes a plurality of teeth provided around the rotational center axis, and
   each of the teeth includes first and second inclined surfaces, which are inclined at different angles from each other, and a peak formed between the first and second inclined surfaces.

7. The wheel-securing axle assembly according to claim 6, wherein
the second annular tooth element includes a plurality of teeth provided around the rotational center axis, and
the teeth of the second annular tooth element are configured to engage with the teeth of the first annular tooth element.

8. The wheel-securing axle assembly according to claim 5, wherein the tooth element biasing member biases the first annular tooth element toward the second annular tooth element so that the first annular tooth element is movable in the axial direction relative to the second annular tooth element.

9. The wheel-securing axle assembly according to claim 1, wherein the one-way clutch mechanism includes a housing element, and the housing element is supported by the shaft so that the housing element is rotatable around the rotational center axis, the housing element rotates together with the shaft when the housing element is rotated in the first direction, and the housing element rotates independently from the shaft when the housing element is rotated in the second direction.

10. The wheel-securing axle assembly according to claim 9, wherein the lock member is pivotally coupled to the housing element so that the lock member can be manually pivoted to a locking position in which the bicycle body contacts the locking member and prevents rotation of the housing element in the second direction.

11. The wheel-securing axle assembly according to claim 1, wherein the shaft includes a built-in socket formed in an end surface of one of the first and second end portions, and the built-in socket is adapted to receive a tool for screwing the threaded section of the shaft into a correspondingly threaded opening in the bicycle body.

12. The wheel-securing axle assembly according to claim 1, further comprising a washer, wherein the washer includes a non-smooth surface that is adapted to contact a fastening surface of the bicycle body, and a smooth surface that contacts a flange of the shaft, wherein the washer is clamped between the flange and the fastening surface of the bicycle body when the wheel-securing axle is fastened to the bicycle body.

13. The wheel-securing axle assembly according to claim 1, wherein the shaft is a hollowed out shaft with a blind bore.

14. The wheel-securing axle assembly according to claim 1, further comprising a retainer element, wherein the one-way clutch mechanism is located on the first end portion, and the retainer element is arranged on the second end portion of the shaft.

15. The wheel-securing axle assembly according to claim 14, wherein the retainer element has a maximum radius that is larger than a radius of the threaded section, and the retainer element is capable of being radially retracted to a radius that is less than or equal to that of the threaded section to permit removal of the shaft from the bicycle body.

16. The wheel-securing axle assembly according to claim 15, wherein the retainer element is biased in a radially outward direction by an actuator element, and the actuator element is biased in an axial direction by an actuator biasing element.

17. The wheel-securing axle assembly according to claim 16, wherein a button extends axially from the second end portion of the shaft, and the button is coupled to the actuator element, and the retainer element is retracted radially inward by pushing the button in the axial direction.

18. The wheel-securing axle assembly according to claim 1, wherein the lock member has a pivotal axis extending in a tangential direction relative to the rotational center axis, wherein when the lock member is pivoted about the pivotal axis to a locking position, the bicycle body interferes with the lock member, and wherein when the lock member is pivoted about the pivotal axis to an unlocking position the lock member avoids contact with the bicycle body.

19. A wheel-securing axle assembly for securing a wheel to a bicycle body, wherein the wheel-securing axle assembly comprises:
a shaft that includes a first end portion and a second end portion, wherein the second end portion being located at an opposite end of the shaft with respect to the first end portion, the first end portion including a hexagonal surface, the second end portion including a threaded section, the shaft having a rotational center axis;
a one-way clutch mechanism including a housing and a lock member pivotally coupled to the housing and the lock member is adapted to contact the bicycle body, the one-way clutch mechanism being located at the first end portion and further including
a first annular tooth element having a hexagonal through opening that mates with the hexagonal surface of the first end portion and causes the first annular tooth element to rotate integrally with the shaft wherein the first annular tooth element includes a plurality of teeth provided around both the hexagonal through opening and the rotational center axis, and each of the teeth includes first and second inclined surfaces, which are inclined at different angles from each other, and a peak formed between the first and second inclined surfaces,
a second annular tooth element arranged in the housing and rotates about the rotational center axis independently of the shaft, the second annular tooth element includes a plurality of teeth provided around the rotational center axis, and the teeth of the second annular tooth element are configured to engage with the teeth of the first annular tooth element, and
a tooth element biasing member that elastically biases one of the first and second annular tooth elements toward the other of the first and second annular tooth elements in an axial direction of the rotational center axis, wherein the tooth element biasing member biases the first annular tooth element toward the second annular tooth element so that the first annular tooth element is movable in the axial direction relative to the second annular tooth element, and wherein
the lock member being configured to limit relative rotation of the shaft with respect to the bicycle body in the second direction about the rotational center axis when the lock member contacts the bicycle body.

20. A wheel-securing axle assembly for securing a wheel to a bicycle body, wherein the wheel-securing axle assembly comprises:
a shaft that includes a first end portion and a second end portion, wherein the second end portion being located at an opposite end of the shaft with respect to the first end portion, the second end portion including a threaded section, the shaft having a rotational center axis;
a one-way clutch mechanism including a lock member adapted to contact the bicycle body, the one-way clutch mechanism being located at the first end portion or second end portion and being configured to be in a slipping state that permits relative rotation of the shaft with respect to the lock member in a first direction about the rotational center axis and to be in a non-slipping state that limits relative rotation of the shaft with respect to the lock member in a second direction opposite to the first direction, the lock member being configured to limit relative rotation of the shaft with respect to the bicycle body in the second direction about the rotational center axis when the lock member contacts the bicycle body.

21. A wheel-securing axle assembly for securing a wheel to a bicycle body, wherein the wheel-securing axle assembly comprises:
   a shaft that includes a first end portion and a second end portion, wherein the second end portion being located at an opposite end of the shaft with respect to the first end portion, the second end portion including a threaded section, the shaft having a rotational center axis;
   a one-way clutch mechanism including a housing element rotatably supported on the shaft, a lock member coupled to the housing element and adapted to contact the bicycle body, and an annular tooth element supported on the shaft to rotate integrally with the shaft in the housing element, the one-way clutch mechanism being located at the first end portion or second end portion and being configured to generate a limited axial movement of the annular tooth element on the shaft to permit relative rotation of the shaft with respect to the lock member in a first direction about the rotational center axis and not to generate the limited axial movement of the annular tooth element on the shaft to limit relative rotation of the shaft with respect to the lock member in a second direction opposite to the first direction, the lock member being configured to limit relative rotation of the shaft with respect to the bicycle body in the second direction about the rotational center axis when the lock member contacts the bicycle body.

* * * * *